(12) United States Patent
Wang et al.

(10) Patent No.: US 11,218,643 B2
(45) Date of Patent: Jan. 4, 2022

(54) EXPOSURE COMPENSATING METHOD AND RELATED CAMERA APPARATUS

(71) Applicant: VIVOTEK INC., New Taipei (TW)

(72) Inventors: Hsiang-Sheng Wang, New Taipei (TW); Shih-Hsuan Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 9 days.

(21) Appl. No.: 16/878,560

(22) Filed: May 19, 2020

(65) Prior Publication Data

US 2020/0396364 A1  Dec. 17, 2020

(30) Foreign Application Priority Data

Jun. 11, 2019 (TW) .................................. 108120112

(51) Int. Cl.
*H04N 5/235* (2006.01)
*G06T 7/136* (2017.01)

(52) U.S. Cl.
CPC ........... *H04N 5/2353* (2013.01); *G06T 7/136* (2017.01); *H04N 5/2351* (2013.01); *G06T 2207/20021* (2013.01)

(58) Field of Classification Search
CPC ............. H04N 5/23218; H04N 5/2351; H04N 5/2352; H04N 5/2353; G06T 7/136; G06T 2207/20021
See application file for complete search history.

(56) References Cited

U.S. PATENT DOCUMENTS

| 2009/0219387 | A1  | 9/2009  | Marman |
|---|---|---|---|
| 2012/0105672 | A1* | 5/2012  | Doepke ................ H04N 5/2351 348/229.1 |
| 2012/0262600 | A1  | 10/2012 | Velarde |
| 2013/0147986 | A1* | 6/2013  | Chen ........................ G03B 7/14 348/229.1 |
| 2018/0183986 | A1* | 6/2018  | Smith .................... H04N 5/243 |

FOREIGN PATENT DOCUMENTS

| CN | 103391404 A | 11/2013 |
|---|---|---|
| CN | 103826066 A | 5/2014 |
| CN | 104065887 A | 9/2014 |
| EP | 2 565 843 A2 | 3/2013 |

* cited by examiner

*Primary Examiner* — Daniel M Pasiewicz
(74) *Attorney, Agent, or Firm* — Winston Hsu

(57) ABSTRACT

An exposure compensating method applied to a camera apparatus includes acquiring a monitoring image captured by the camera apparatus via an exposure parameter, computing an estimating exposure compensating value of the monitoring image according to a triggering threshold, analyzing continuity in pixels of the monitoring image with intensity conforming to a specific condition to acquire a weighting adjustment value of a region of interest, adjusting the estimating exposure compensating value via the weighting adjustment value to generate a final exposure compensating value, and adjusting the exposure parameter by the final exposure compensating value.

18 Claims, 16 Drawing Sheets

| 161 | 871 | 544 | 530 | 195 | 103 | 105 | 108 | 109 | 68 | 65 | 65 | 68 | 210 | 628 | 889 | 487 |
|---|---|---|---|---|---|---|---|---|---|---|---|---|---|---|---|---|
| 63 | 445 | 481 | 367 | 146 | 105 | 106 | 108 | 108 | 71 | 69 | 69 | 71 | 303 | 991 | 580 | 268 |
| 61 | 81 | 93 | 91 | 98 | 94 | 93 | 96 | 102 | 114 | 116 | 115 | 111 | 120 | 122 | 139 | 110 |
| 85 | 88 | 93 | 79 | 103 | 98 | 62 | 59 | 108 | 120 | 121 | 123 | 120 | 125 | 124 | 119 | 115 |
| 86 | 90 | 93 | 77 | 102 | 96 | 96 | 94 | 107 | 121 | 125 | 126 | 124 | 128 | 126 | 120 | 119 |
| 80 | 86 | 88 | 96 | 101 | 101 | 108 | 112 | 112 | 119 | 121 | 122 | 124 | 126 | 122 | 121 | 115 |
| 78 | 84 | 87 | 93 | 101 | 101 | 106 | 104 | 111 | 117 | 121 | 122 | 128 | 129 | 125 | 123 | 115 |
| 75 | 73 | 76 | 163 | 450 | 374 | 101 | 106 | 107 | 113 | 118 | 296 | 493 | 270 | 125 | 118 | 115 |
| 74 | 69 | 79 | 90 | 229 | 238 | 98 | 104 | 106 | 111 | 117 | 214 | 294 | 149 | 125 | 119 | 113 |
| 74 | 77 | 80 | 84 | 88 | 92 | 95 | 101 | 105 | 110 | 107 | 94 | 115 | 137 | 179 | 121 | 98 |
| 89 | 149 | 85 | 88 | 92 | 147 | 145 | 106 | 110 | 116 | 156 | 167 | 117 | 129 | 148 | 195 | 95 |
| 84 | 84 | 99 | 98 | 101 | 106 | 111 | 105 | 117 | 126 | 136 | 137 | 134 | 133 | 132 | 106 | 201 |
| 68 | 77 | 93 | 97 | 90 | 85 | 141 | 101 | 103 | 111 | 144 | 117 | 109 | 113 | 97 | 93 | 105 |
| 82 | 90 | 107 | 114 | 102 | 96 | 101 | 87 | 64 | 71 | 81 | 90 | 108 | 148 | 155 | 90 | 97 |
| 73 | 132 | 171 | 210 | 184 | 166 | 184 | 183 | 183 | 209 | 242 | 179 | 140 | 190 | 177 | 112 | 115 |

|   |   |   |   |   |   |   |   |   |   |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 5 | 0 | 0 | 0 | 1 | 0 | 0 | 0 |
| 0 | 0 | 0 | 2 | 3 | 0 | 0 | 0 | 0 | 0 |
| 0 | 0 | 0 | 1 | 0 | 0 | 0 | 0 | 0 | 0 |
| 0 | 0 | 0 | 0 | 4 | 1 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |

EXPOSURE COMPENSATING METHOD AND RELATED CAMERA APPARATUS

BACKGROUND OF THE INVENTION

1. Field of the Invention

The present invention relates to an exposure compensating method and a camera apparatus, and more particularly, to an exposure compensating method and a related camera apparatus for providing preferred advanced efficacy of image overexposure.

2. Description of the Prior Art

A conventional image exposure adjusting method has some steps of generating a histogram of an image from the camera apparatus, and dividing the histogram into several regions according to a grey level of each pixel. A region with pixels in the high grey level is a bright region of the image, and a region with pixels in the low grey level is a dark region of the image. When intensity of the image is decreased, the conventional image exposure adjusting method computes a trend of the dark region in the histogram to increase the intensity of the image by adjusting an exposure parameter (which means the whole histogram is shifted in a direction toward the high-grey-level place), and vice versa. The conventional image exposure adjusting method does not consider intensity distribution of the whole histogram; one side of the histogram may have better visibility, but the visibility of the whole image is spoiled. The conventional image exposure adjusting method may overcome one over-bright or over-dark problem of the image, but some regions with normal intensity distribution is affected and results in low visibility, so that a main monitoring region in the image may lose details. As an example of the monitoring apparatus, infrared is a common tool for auxiliary illumination in the night or any dark circumstance. If an object is close to the infrared lamp of the monitoring apparatus, a region of the object in the image is overexposed and image data about the object may be lost. The conventional image exposure adjusting method may adjust an overexposed parameter according to pixel information of the overexposed region to suppress overexposure phenomenon in the image; however, if the overexposed region in the image belongs to the background light source, such as a vehicle lamp, a street lamp and/or a building lamp, intensity of the main monitoring area or object in the image is decreased, which results in low visibility. Therefore, design of an exposure compensating algorithm capable of preventing the monitoring image from overexposing and preserving details of the dark areas in the monitoring image is an important issue in the monitoring apparatus industry.

SUMMARY OF THE INVENTION

The present invention provides an exposure compensating method and a related camera apparatus for providing preferred advanced efficacy of image overexposure for solving above drawbacks.

According to the claimed invention, an exposure compensating method applied to a camera apparatus is disclosed. The exposure compensating method includes acquiring a monitoring image captured by the camera apparatus via an exposure parameter, computing an estimating exposure compensating value of the monitoring image according to a triggering threshold, analyzing continuity in pixels of the monitoring image with intensity conforming to a specific condition to acquire a weighting adjustment value of a region of interest, adjusting the estimating exposure compensating value via the weighting adjustment value to generate a final exposure compensating value, and adjusting the exposure parameter by the final exposure compensating value.

According to the claimed invention, a camera apparatus includes an image receiver and an operation processor. The image receiver is adapted to acquire at least one monitoring image via an exposure parameter. The operation processor is electrically connected with the image receiver and adapted to compute an estimating exposure compensating value of the monitoring image according to a triggering threshold, analyze continuity in pixels of the monitoring image with intensity conforming to a specific condition to acquire a weighting adjustment value of a region of interest, adjust the estimating exposure compensating value via the weighting adjustment value to generate a final exposure compensating value, and adjust the exposure parameter by the final exposure compensating value.

The exposure compensating method and the related camera apparatus of the present invention can utilize the triggering threshold to analyze an overexposed degree of the monitoring image, so as to compute the estimating exposure compensating value and then analyze continuity of the overexposed pixels inside the monitoring image, for determining whether a region constructed by the overexposed pixels belongs to the region of interest. If the region constructed by the overexposed pixels belongs to the region of interest, pixel information about the region of interest can be used to compute the weighting adjustment value, and the final exposure compensating value can be computed according to the weighting adjustment value and the estimating exposure compensating value. If the region constructed by the overexposed pixels does not belong to the region of interest, such as the continuous dimension of the overexposed pixels being smaller than dimension of the region of interest, searching for the region of interest is persisted. The estimating exposure compensating value can be adjusted by the weighting adjustment value to generate the final exposure compensating value; if the monitoring image contains a lot of small dimensional scenes, the conventional metering method only gets the estimating exposure compensating value, but the exposure compensating method of the present invention can effectively reduce convergence degree to preserve main details, which means the exposure compensating method of the present invention can prevent overexposure compensation from being affected by overexposure of the region of non-interest, so as to keep intensity of the monitoring image in a receivable visible level.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a diagram of intensity distribution information according to the embodiment of the present invention.

FIG. 11 to FIG. 17 are diagrams of the monitoring image varied in different analysis steps according to the embodiment of the present invention.

DETAILED DESCRIPTION

Figure 1:
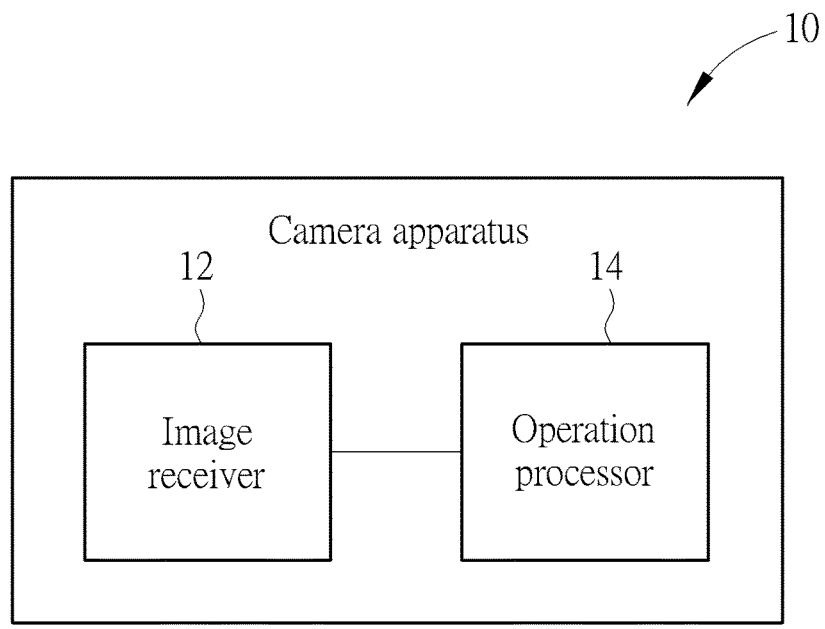
FIG. 1 is a functional block diagram of a camera apparatus according to an embodiment of the present invention.
Figure 2:
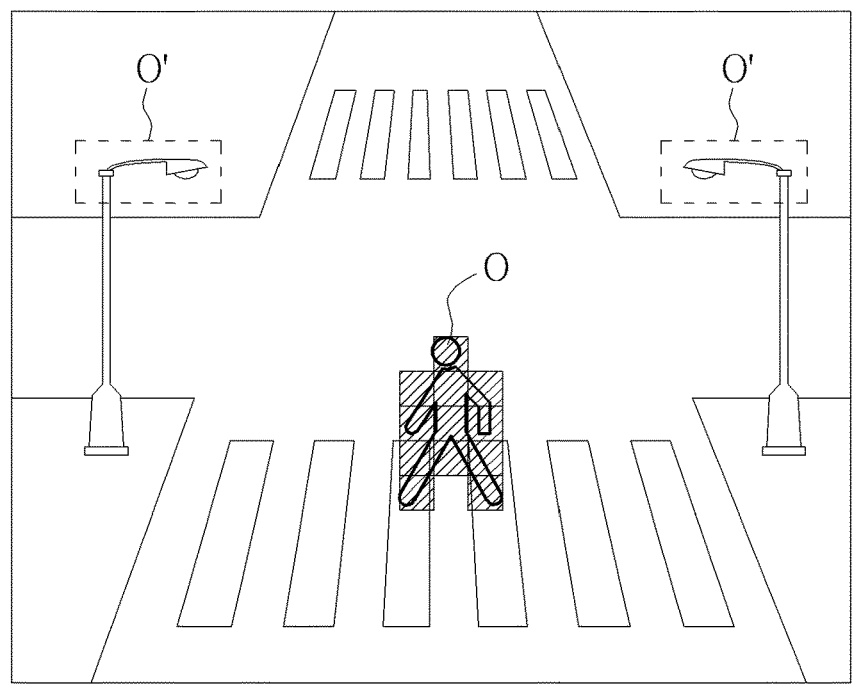
FIG. 2 is a diagram of a monitoring image acquired by the camera apparatus according to the embodiment of the present invention.
Figure 3:
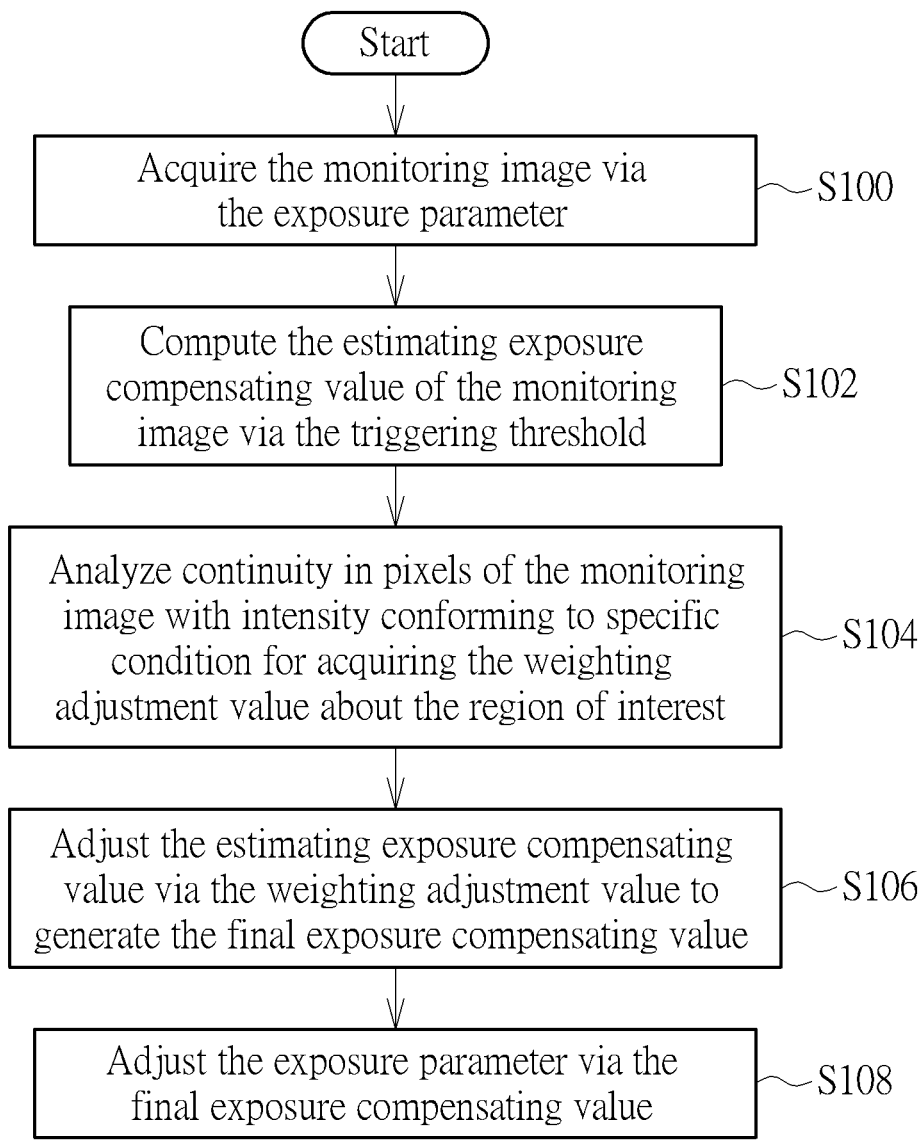
FIG. 3 is a flow chart of an exposure compensating method according to the embodiment of the present invention.

Please refer to FIG. 1 to FIG. 3. FIG. 1 is a functional block diagram of a camera apparatus 10 according to an embodiment of the present invention. FIG. 2 is a diagram of a monitoring image I acquired by the camera apparatus 10 according to the embodiment of the present invention. FIG. 3 is a flow chart of an exposure compensating method according to the embodiment of the present invention. The exposure compensating method illustrated in FIG. 3 is suitable for the camera apparatus 10 shown in FIG. 1. The camera apparatus 10 can include an image receiver 12 and an operation processor 14 electrically connected to each other. The image receiver 12 can be a camera or a photosensitive component, and able to capture or receive the monitoring image I containing a monitoring range of the camera apparatus 10. The operation processor 14 can analyze the monitoring image I acquired by the image receiver 12 to execute the exposure compensating method.

The exposure compensating method of the present invention includes following steps. First, step S100 can utilize the image receiver 12 to acquire the monitoring image I based on an initial exposure parameter. If some area inside the monitoring image I is overexposed (such as a slash area shown in FIG. 2), the initial exposure parameter is in need of extra adjustment to eliminate an overexposure phenomenon in the monitoring image I for clarification. Thus, step S102 can compute an estimating exposure compensating value ECvalue_Es of the monitoring image I via a triggering threshold Trig_thd. The triggering threshold Trig_thd can be defined as an amount ratio of pixels with high intensity in the monitoring image I to all pixels of the monitoring image I. For example, the monitoring image I can be transformed into a histogram, and the triggering threshold Trig_thd can be the pixel amount counted from a highest gray level value to a specific percentage value in the histogram; the specific percentage value can be adjusted according to a dimension of a region of interest.

The camera apparatus 10 can be surveillance equipment extensively used in the city. If a pedestrian is close to the camera apparatus 10, the monitoring image I may have a large scale of overexposure upon the pedestrian due to assistant exposure light of the camera apparatus, and a region composed of a plurality of overexposed pixels can be defined as the region of interest. The region of interest is the main target calibrated by the exposure compensating method of the present invention; however, a streetlamp or a vehicle lamp may form a small overexposed region in the monitoring image I, and is not the calibration target of the exposure compensating method. Thus, step S104 can analyze continuity in pixels of the monitoring image I with intensity conforming to a specific condition, which means some adjacent pixels have the intensity exceeding an overexposed standard and are gathered with each other, and then determine whether the said adjacent pixels belongs to the large dimensional overexposed region of interest or the small dimensional overexposed region, so as to acquire a weighting adjustment value Ad_weighting in accordance with information about the overexposed region.

Then, step S106 can adjust the estimating exposure compensating value ECvalue_Es via the weighting adjustment value Ad_weighting to generate a final exposure compensating value ECvalue_Fn. For example, if the triggering threshold Trig_thd is valued as 5%, an estimated dimension of the overexposed region which triggers overexposure compensation can be five percentage of the total dimension of the monitoring image I. As if a dimension of the said adjacent pixels with the intensity conforming to the specific condition (which is acquired in step S104) is one fifth of the estimated dimension, the weighting adjustment value Ad_weighting can be set as 0.2, and the estimating exposure compensating value ECvalue_Es can be calibrated by the weighting adjustment value Ad_weighting to get the final exposure compensating value ECvalue_Fn for adjusting the initial exposure parameter, which means execution of step S108.

Figure 4:
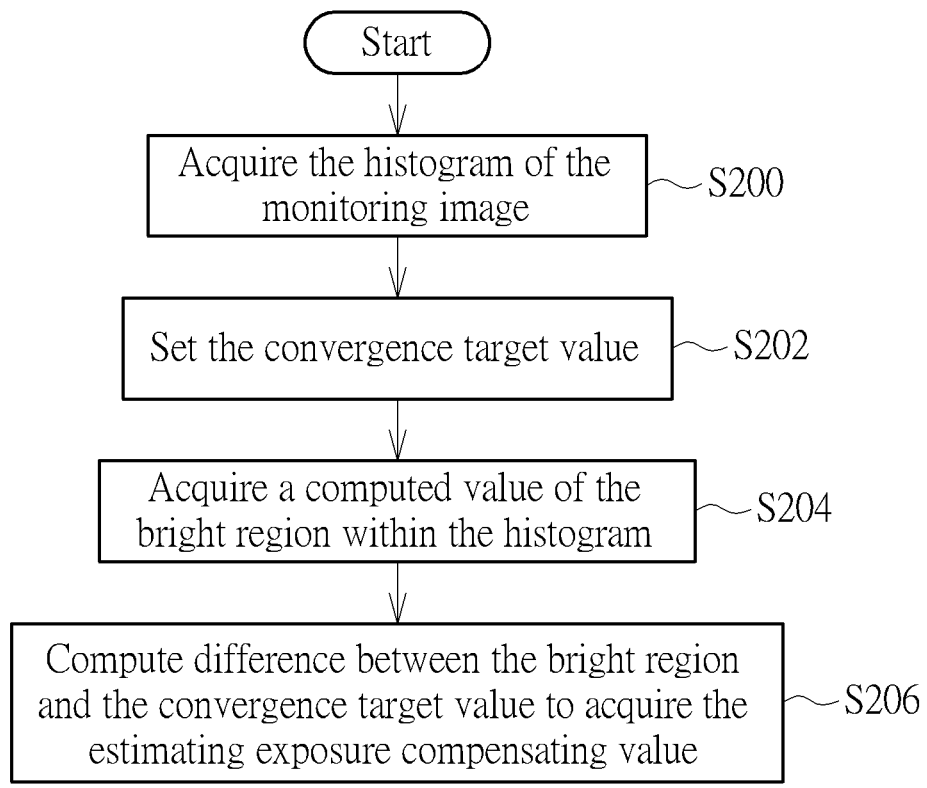
FIG. 4 is a flow chart of specific step in the exposure compensating method according to the embodiment of the present invention.
Figure 5:
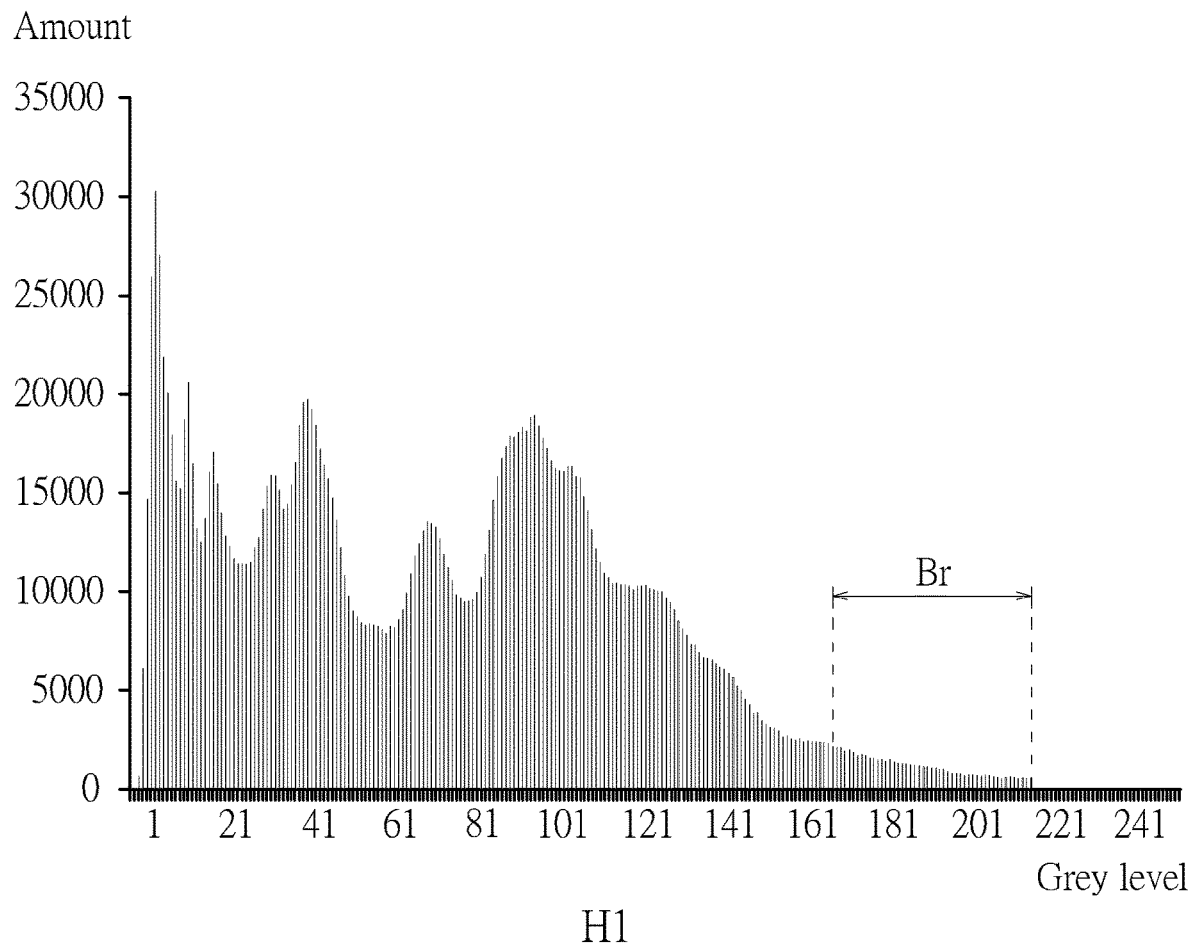
FIG. 5 is a diagram of a histogram according to the embodiment of the present invention.
Figure 6:
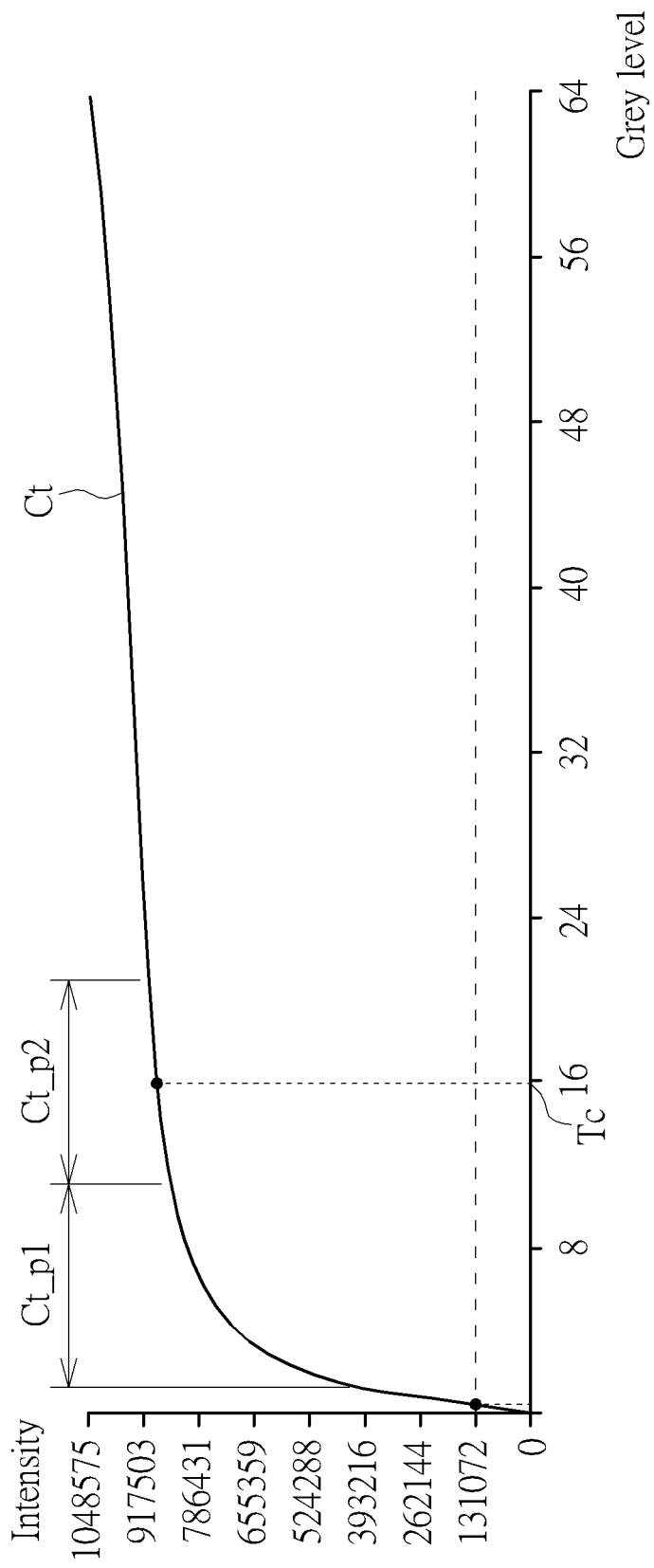
FIG. 6 is a diagram of a transformation curve according to the embodiment of the present invention.

Step S102 may include some minor steps. Please refer to FIG. 4 to FIG. 6. FIG. 4 is a flow chart of step S102 in the exposure compensating method according to the embodiment of the present invention. FIG. 5 is a diagram of a histogram H1 according to the embodiment of the present invention. FIG. 6 is a diagram of a transformation curve Ct according to the embodiment of the present invention. First, steps S200 and S202 can be executed to acquire the histogram H1 of the monitoring image I and set a convergence target value Tc according to an actual application. The histogram H1 shown in FIG. 5 can indicate accumulated distribution of all pixel values in the image. The convergence target value Tc can be optionally set by the transformation curve Ct generated by the image, and the transformation curve Ct can be a dynamic range compression curve (DRC curve) or a local tone mapping curve (LTM curve).

As an example of the DRC curve shown in FIG. 6, step S202 can analyze whether a slope of a specific section within the transformation curve Ct is smaller than a predefined value, for finding out one or some sections of the transformation curve Ct which has the slope identical with or similar to a level state. An actual number of the predefined value depends on design demand, and a detailed description is omitted herein for simplicity. If the slope of one section Ct_p1 is greater than the predefined value, output intensity projected from pixels inside the section Ct_p1 can clearly represent details of the image; if the slope of another section Ct_p2 is smaller than the predefined value, output intensity projected from pixels inside the section Ct_p2 are similar to each other and difficult to identify the details, and the convergent target value Tc can be defined within the section Ct_p2. Then, step S204 can acquire a computed value of a bright region Br within the histogram H1. The computed value of the bright region Br can be relevant to products of each gray scale value and a corresponding amount inside its regional range, such as a sum or a mean of the products. Final, step S206 can utilize formula 1 to compute difference between the bright region Br and the convergence target value Tc to acquire the estimating exposure compensating value ECvalue_Es.

$$ECvalue\_Es = \log_2(Tc/Br) \qquad \text{Formula 1}$$

Figure 7:
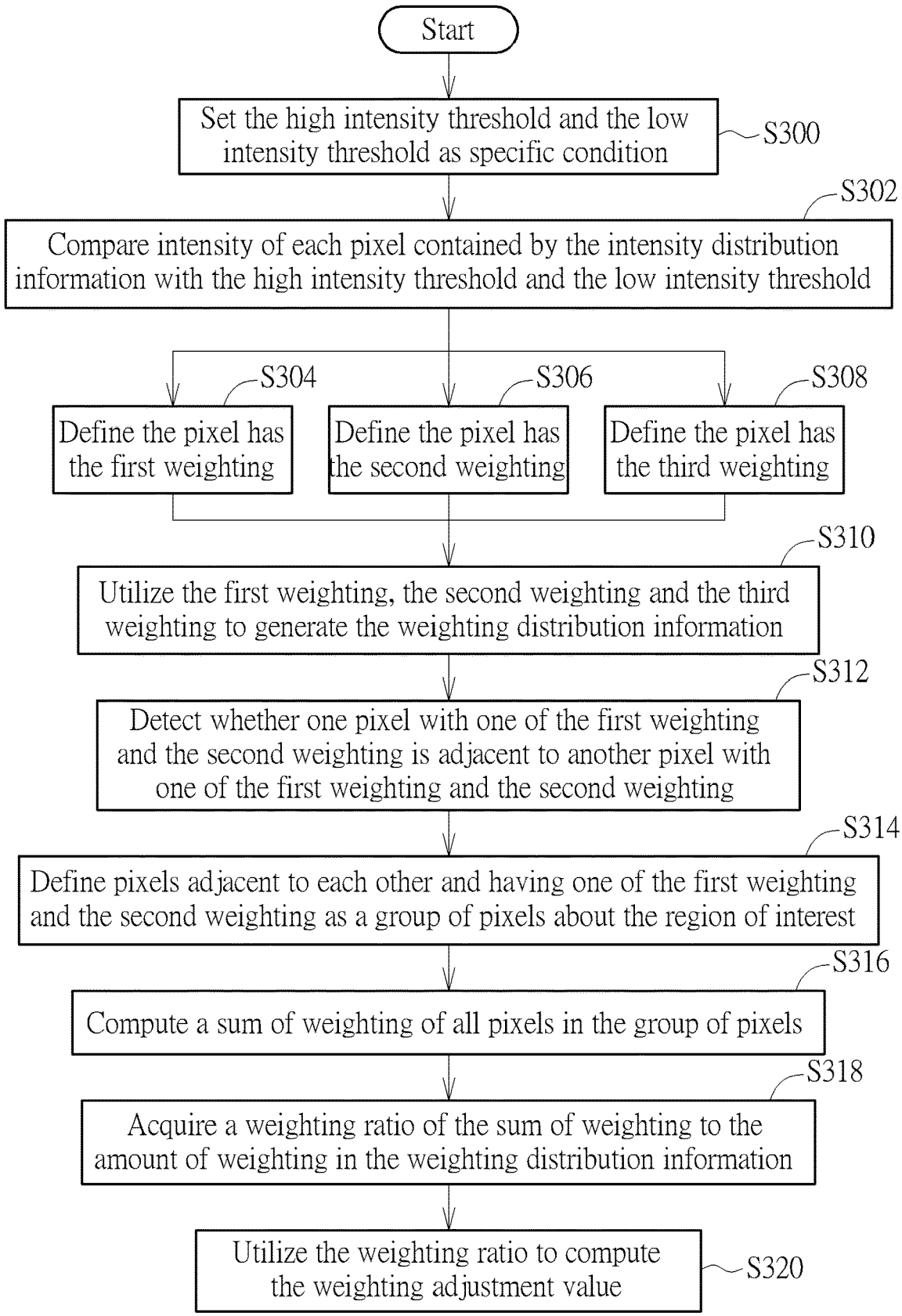
FIG. 7 is a flow chart of specific step in the exposure compensating method according to the embodiment of the present invention.
Figure 9:
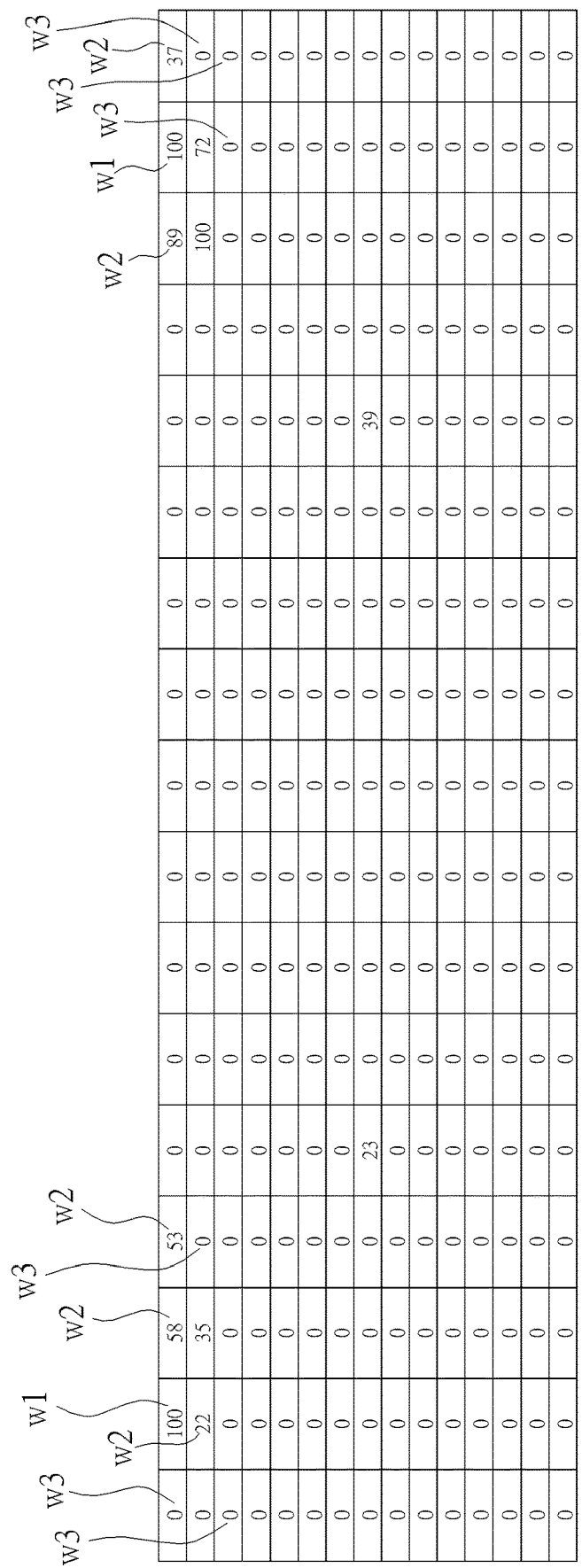
FIG. 9 is a diagram of weighting distribution information according to the embodiment of the present invention.

Step S104 may include some minor steps. Please refer to FIG. 7 to FIG. 9. FIG. 7 is a flow chart of step S104 in the exposure compensating method according to the embodiment of the present invention. FIG. 8 is a diagram of intensity distribution information I1 according to the embodiment of the present invention. FIG. 9 is a diagram of weighting distribution information I2 according to the embodiment of the present invention. First, the present invention can use pixel intensity as a sieving condition of the region of interest, and step S300 can set a high intensity threshold Th_high and/or a low intensity threshold Th_low as the specific condition. The pixel may be represented as in overexposure when the pixel intensity is greater than the high intensity threshold Th_high, and further be represented as not in the overexposure when the pixel intensity is smaller than the low intensity threshold Th_low. When the pixel intensity is smaller than (or equal to) the high intensity threshold Th_high but greater than (or equal to) the low intensity threshold Th_low, the pixel can be represented as buffer between the overexposed region and the non-overexposed region, so as to avoid some pixel with the intensity slightly smaller than the high intensity threshold Th_high from not triggering adjustment of weighting, which may result in inaccurate calculation and damage of final exposure adjustment.

Then, step S302 can compare intensity of the plurality of pixels contained by the intensity distribution information I1 of the monitoring image I with the high intensity threshold Th_high and/or the low intensity threshold Th_low. If the pixel intensity is greater than the high intensity threshold Th_high, the pixel is overexposed, and step S304 can be executed to define the pixel has a first weighting w1. If the pixel intensity is ranged between the high intensity threshold Th_high and the low intensity threshold Th_low, the pixel intensity is represented as being slightly lower than the overexposure intensity, and step S306 can be executed to compute the pixel has a second weighting w2 via interpolation. If the pixel intensity is smaller than the low intensity threshold Th_low, the pixel is not overexposed, and step S308 can be executed to define the pixel has a third weighting w3. For example, the first weighting w1 can be a value of 100, and the third weighting w3 can be a value of 0, and the second weighting w2 can be any value ranged between 0~100 via interpolated computation. Moreover, the weighting values can be adjusted in accordance with an actual application, for example, the first weighting w1 can be a value of 200, and the third weighting w3 can be a value of 0, and the second weighting w2 can be a value ranged between 0~200 via the interpolated computation. Then, step S310 can utilize the first weighting w1, the second weighting w2 and the third weighting w3 about the plurality of pixels to generate the weighting distribution information I2.

After the weighting distribution information I2 is completed, steps S312 and S314 can detect whether one pixel with one of the first weighting w1 and the second weighting w2 is adjacent to another pixel with one of the first weighting w1 and the second weighting w2 inside the weighting distribution information I2, and define several pixels adjacent to each other and having one of the first weighting w1 and the second weighting w2 as a group of pixels about the region of interest. If an amount of the foresaid group of pixels is plural, such as two groups of pixels located on the left side and the right side of the weighting distribution information I2 respectively, the monitoring image I may have a plurality of overexposed regions, so the exposure compensating method of the present invention can select and define one group of pixels with the maximal dimension from the plurality of groups of pixels as the region of interest, and execute exposure compensation according to a computation result of the maximal dimension group of pixels. An actual application is not limited to the embodiment mentioned above, for example, the present invention may define the group of pixels which does not have the maximal dimension and conforms to other specific term as the region of interest.

Then, steps S316, S318 and S320 can compute a sum of weighting of pixels in the group of pixels relevant to the region of interest (such like the first weighting 100 and the second weighting 58, 53, 35 and 22 are added to get the sum 268), acquire a weighting ratio (which can be represented as a symbol iMaxObjPer illustrated in formula 2) of the sum of weighting (such as the value 268) to an amount of weighting of the weighting distribution information I2 (such as the value 255 equal to a grid number of the weighting distribution information I2), and utilize the weighting ratio about the group of pixels to compute the weighting adjustment value Ad_weighting. In this embodiment, the symbol iMaxObjPer can be a quotient computed by the dividend (which means the sum of weighting 268) and the divisor (which means the amount of weighting 255). Rather than compute the sum of weighting about all pixels in the maximal dimension group of pixels, step S316 may compute the sum of pixel weighting about several groups of pixels and acquire a plurality of weighting ratios. The exposure compensating method of the present invention preferably can choose the largest weighting ratio from the plurality of weighting ratios to compute the weighting adjustment value Ad_weighting; however, an actual application is not limited to the above-mentioned embodiment. For example, the present invention can choose the weighting ratio which does not have the largest value but conforms to other specific condition for computing the weighting adjustment value Ad_weighting.

In step S320, the exposure compensating method of the present invention can set a high intensity triggering parameter Trig_high, a low intensity triggering parameter Trig_low, a high level compensation parameter Com_high and a low level compensation parameter Com_low. A value of the high intensity triggering parameter Trig_high can be adjusted according to the dimension of the region of interest, and be a superior limit of the weighting ratio iMaxObjPer. In the present invention, the high intensity triggering parameter Trig_high and the triggering threshold Trig_thd can be the same or different for each other. The low intensity triggering parameter Trig_low can be the lowest limit for determining whether exposure compensation of the monitoring image I is executed. The high level compensation parameter Com_high can represent compensation quantity needed when the pixel intensity of the region of interest conforms to the high intensity threshold Th_high. The low level compensation parameter Com_low can represent compensation quantity preset when the region of interest is not existed. In step S320, if the weighting ratio iMaxObjPer is greater than the high intensity triggering parameter Trig_high, the weighting adjustment value Ad_weighting can be set as the high level compensation parameter Com_high; if the weighting ratio iMaxObjPer is smaller than the low intensity triggering parameter Trig_low, the weighting adjustment value Ad_weighting can be set as the low level compensation parameter Com_low. If the weighting ratio iMaxObjPer is ranged between the high intensity triggering parameter Trig_high and the low intensity triggering parameter Trig_low, the weighting adjustment value Ad_weighting can be computed via an interpolation manner by utilizing the high intensity triggering parameter Trig_high and the low intensity triggering parameter Trig_low according to a difference between the high level compensation parameter Com_high and the low level compensation parameter Com_low, as formula 2.

$$\text{Ad\_weighting} = (\text{Com\_low}) + \frac{(iMaxObjPer - \text{Trig\_low}) \times (\text{Com\_high} - \text{Com\_low})}{(\text{Trig\_high} - \text{Trig\_low})} \quad \text{Formula 2}$$

$$\text{ECvalue\_Fn} = \text{ECvalue\_Es} \times \text{Ad\_weighting} \quad \text{Formula 3}$$

In step S106, the estimating exposure compensating value ECvalue_Es can be adjusted via the weighting adjustment value Ad_weighting to generate the final exposure compensating value ECvalue_Fn. Generally, the exposure compensating method of the present invention can compute a product of the weighting adjustment value Ad_weighting and the estimating exposure compensating value ECvalue_Es, and the said product can be directly used as the final exposure compensating value ECvalue_Fn, such like formula 3. For example, when the estimating exposure compensating value ECvalue_Es is equal to 1 Ev, and total dimension of the adjacent pixels with intensity conforming to the specific condition in the monitoring image I is a small part of the region of interest and thus the weighting adjustment value Ad_weighting can be computed as 0.2 due to corresponding weight of the adjacent pixels, the final exposure compensating value ECvalue_Fn can be 0.2 Ev.

Figure 10A:
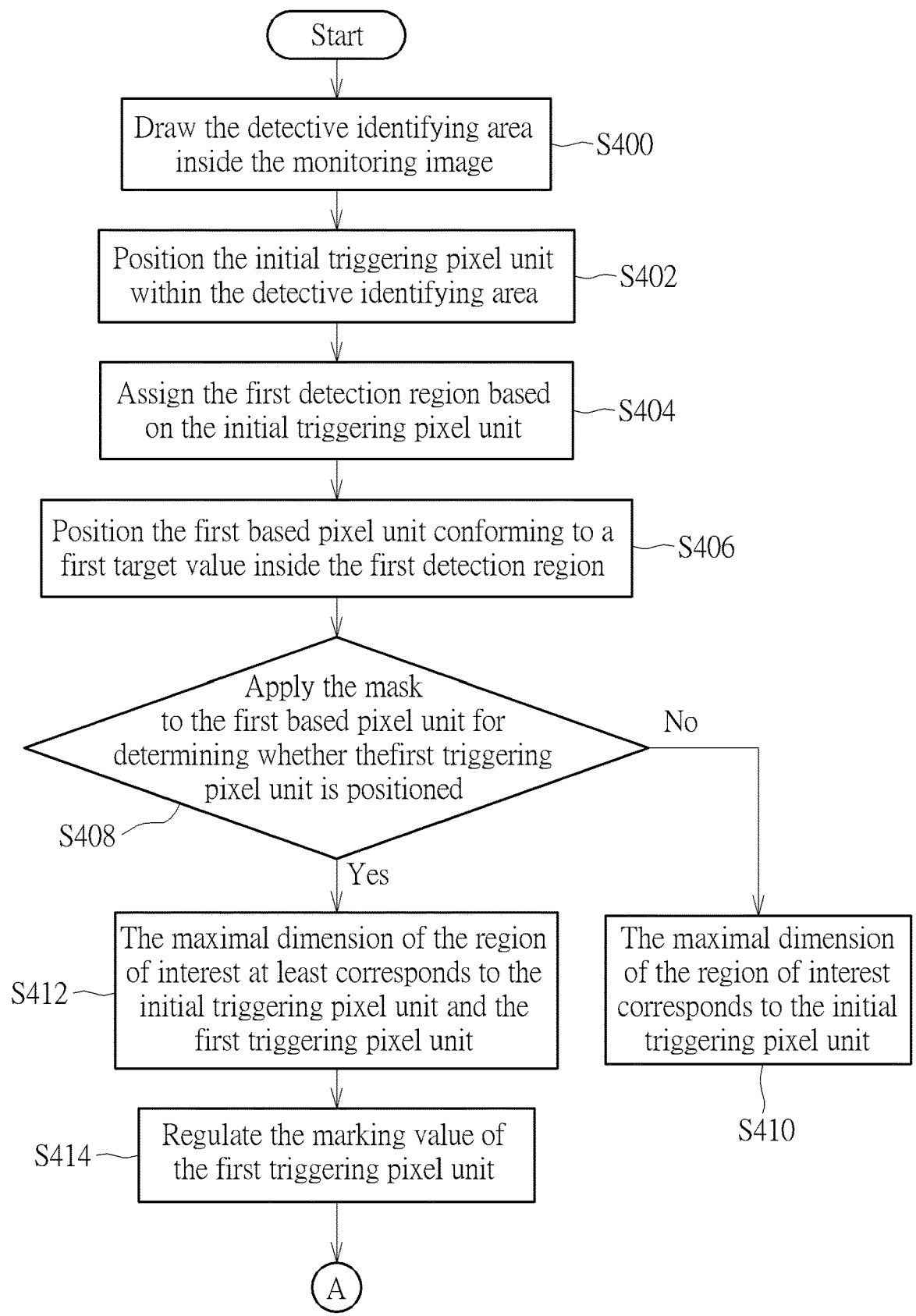
FIG. 10A and FIG. 10B are flow charts of specific steps in the exposure compensating method according to the embodiment of the present invention.
Figure 10B:
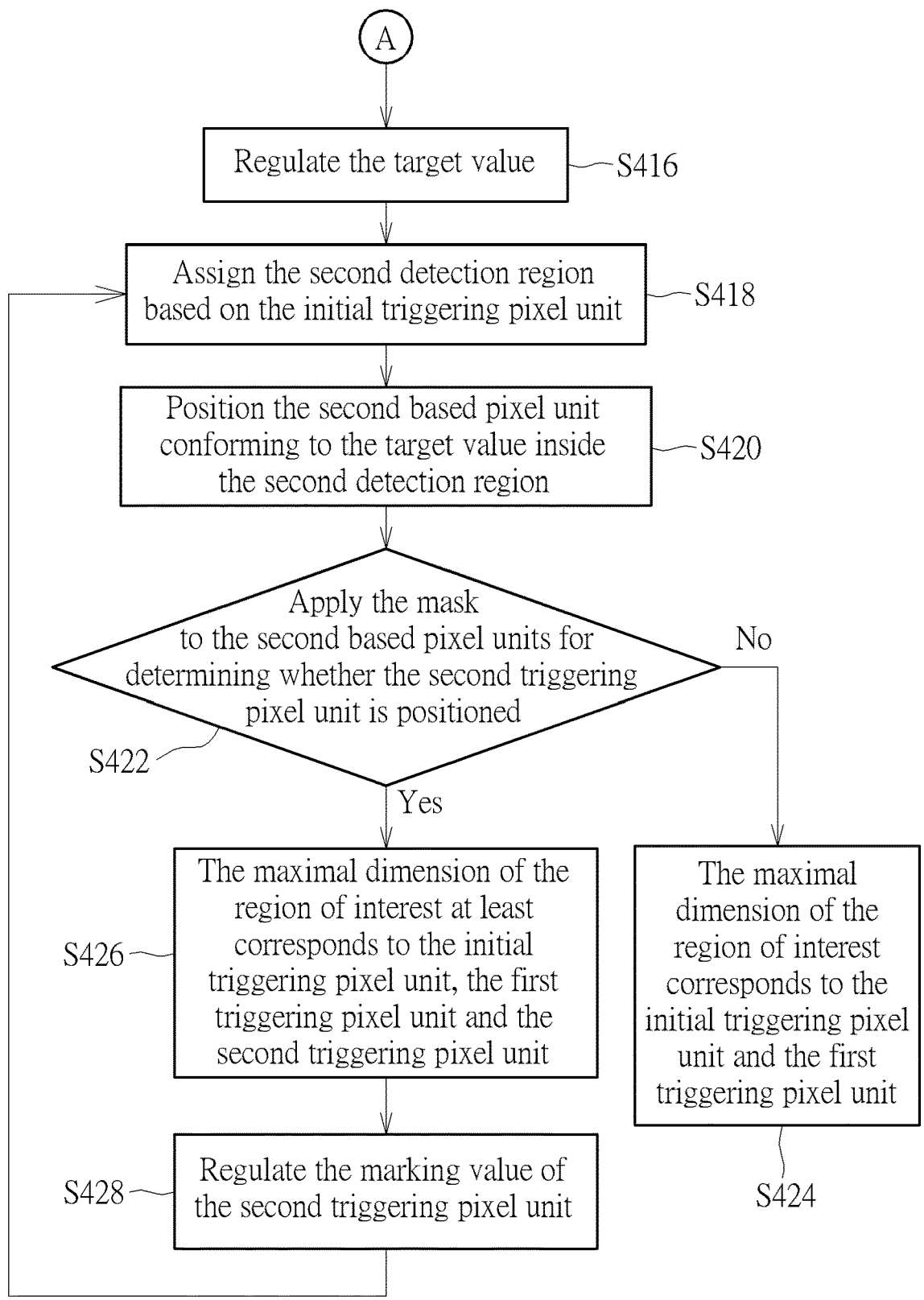
Figures 11, 12:
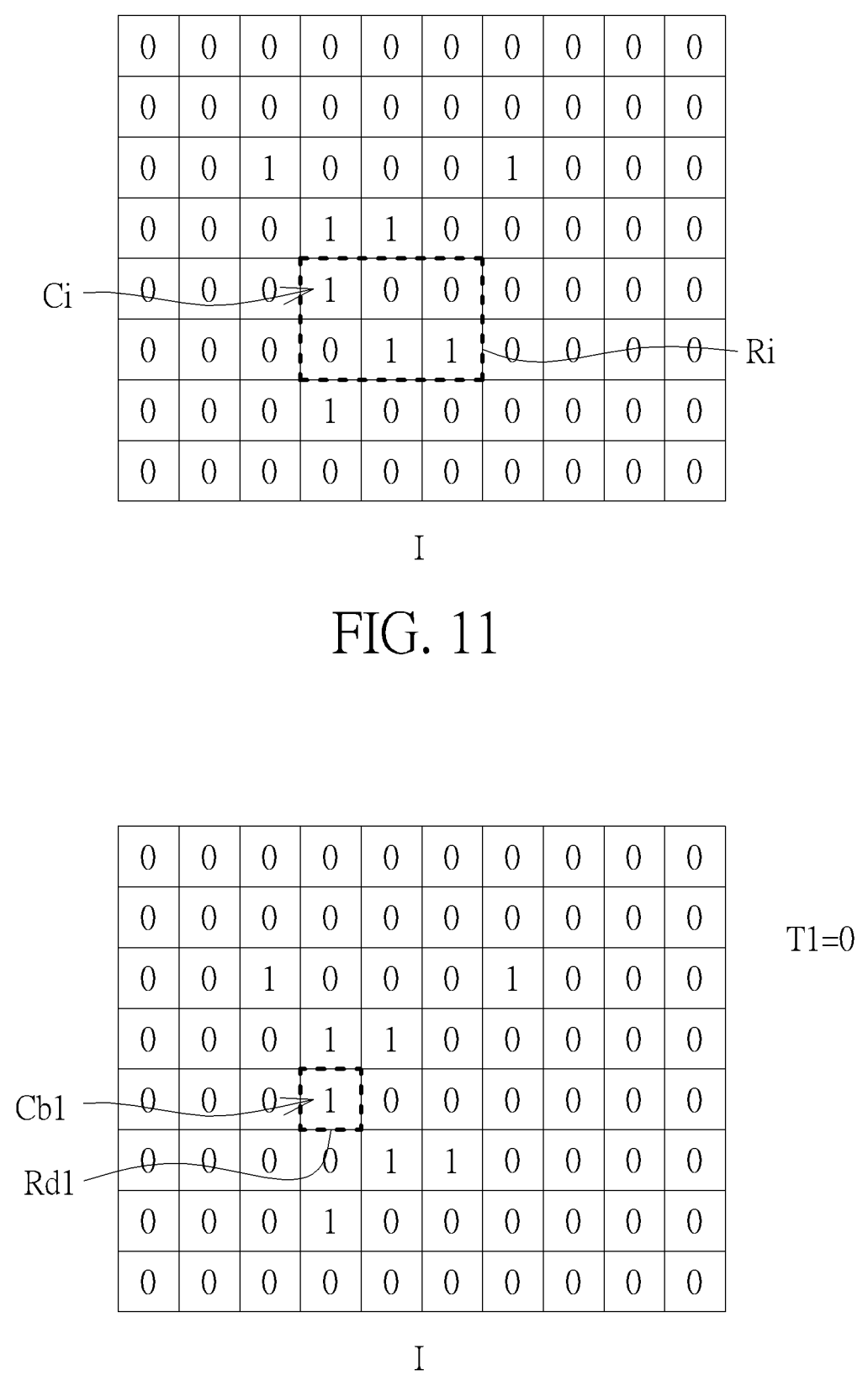

Steps S312 and S314 may include some minor steps. Please refer to FIG. 10A and FIG. 10B to FIG. 17. FIG. 10A and FIG. 10B are flow charts of steps S312 and S314 in the exposure compensating method according to the embodiment of the present invention. FIG. 11 to FIG. 17 are diagrams of the monitoring image I varied in different analysis steps according to the embodiment of the present invention. The method illustrated in FIG. 10A and FIG. 10B are suitable for the camera apparatus 10 shown in FIG. 1. First, the monitoring image I may be transformed into a binary map; the monitoring image I is composed of pixel units. The triggering pixel unit can have an initial targeted value as the numeral 1 (such as the pixels with the first weighting w1 or the second weighting w2), and the non-triggered pixel unit can have the initial targeted value as the numeral 0 (such as the pixels with the third weighting w3); it should be mentioned that an actual application is not limited to the above-mentioned embodiment. For a start, steps S400 and S402 can be executed to draw a detective identifying area Ri inside the monitoring image I, and to position at least one initial triggering pixel unit Ci within the detective identifying area Ri, as shown in FIG. 11.

The detective identifying area Ri can be automatically marked according to a computation result, or can be marked by an operator manually. The detective identifying area Ri may present some specially concerned area within the monitoring image I. Moreover, the camera apparatus 10 of the present invention may not draw the detective identifying area; meanwhile, the exposure compensating method can position one or several initial triggering pixel units Ci within all range of the monitoring image I for following analysis steps.

Figure 13:
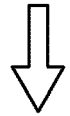

Then, steps S404 and S406 can be executed to assign a first detection region Rd1 with a center based on the initial triggering pixel unit Ci, and to position a first based pixel unit Cb1 conforming to a first target value T1 inside the first detection region Rd1, as shown in FIG. 12. In the related steps, the monitoring image I only contains the triggering pixel unit (which has the initial marking value set as the numeral 1) and the non-triggered pixel unit (which has the initial marking value set as the numeral 0), so the first target value T1 can be set as the numeral 0 for distinguishing the triggering pixel unit from the non-triggered pixel unit. Illustration of conforming to the first target value T1 may represent an aim of searching a pixel unit which has a marking value greater than the first target value T1 and setting the said pixel unit as the first based pixel unit Cb1. The first detection region Rd1 can be a 1×1 matrix, so that the first based pixel unit Cb1 can be represented as the initial triggering pixel unit Ci. Then, step S408 can be executed to apply a mask M with a center based on the first based pixel unit Cb1, for determining whether at least one first triggering pixel unit Ct1 can be positioned inside the mask M, as shown in FIG. 13.

If the first triggering pixel unit Ct1 cannot be positioned inside the mask M, step S410 can be executed to determine the maximal dimension of the region of interest only corresponds to the initial triggering pixel unit Ci. If the first triggering pixel unit Ct1 can be positioned inside the mask M, step S412 can be executed to determine the maximal dimension of the region of interest at least corresponds to the initial triggering pixel unit Ci and the first triggering pixel unit Ct1. The first triggering pixel unit Ct1 and the initial triggering pixel unit Ci both have the initial marking value (such as the numeral 1). For preventing the triggering pixel unit from being searched repeatedly, step S414 can be executed to set the marking value of the Nth first triggering pixel unit Ct1 as an amount of the initial marking value and the numeral N when the first triggering pixel unit Ct1 is positioned. A symbol N is a positive number greater than or equal to the numeral 1. The operation processor 14 can scan all pixel units from up to down and from left to right, and therefore marking values of three first triggering pixel units Ct1 inside the mask M can be respectively set as numerals 2, 3 and 4, as shown in FIG. 13.

Figure 14:
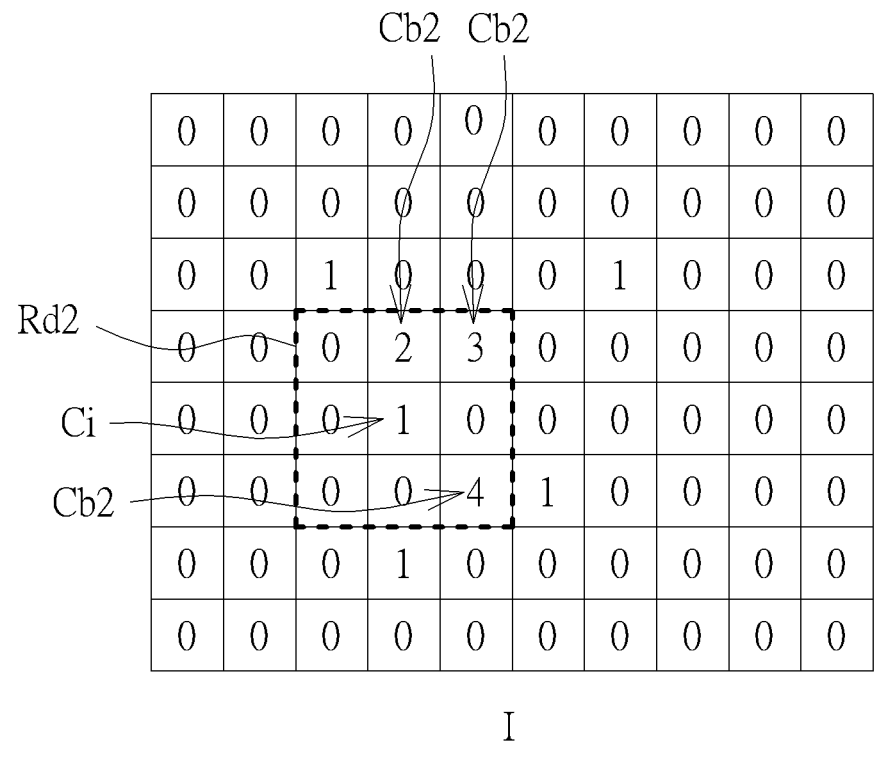

The exposure compensating method can further determine whether the region of interest has a larger dimension, and step S416 can be executed to regulate the first target value T1 to be a second target value T2. The second target value T2 can be used to differentiate the initial triggering pixel unit Ci from the first triggering pixel unit Ct1, so that the second target value T2 can be set as the numeral 1. Then, step S418 can be executed to assign a second detection region Rd2 with a center based on the initial triggering pixel unit Ci, as shown in FIG. 14. The second detection region Rd2 can have a dimension larger than a dimension of the first detection region Rd1. Each side (such as an upper side, a lower side, a left side and a right side) of the first detection region Rd1 can be broadened by one or several pixel units to be a range of the second detection region Rd2; for example, the second detection region Rd2 may be a 3×3 matrix. Then, steps S420 and S422 can be executed to position a second based pixel unit Cb2 conforming to the second target value T2 inside the second detection region Rd2, and to apply the mask M with a center based on one or several second based pixel units Cb2, for determining whether a second triggering pixel unit Ct2 can be positioned inside the mask M, as shown in FIG. 14 to FIG. 17.

Figure 15:
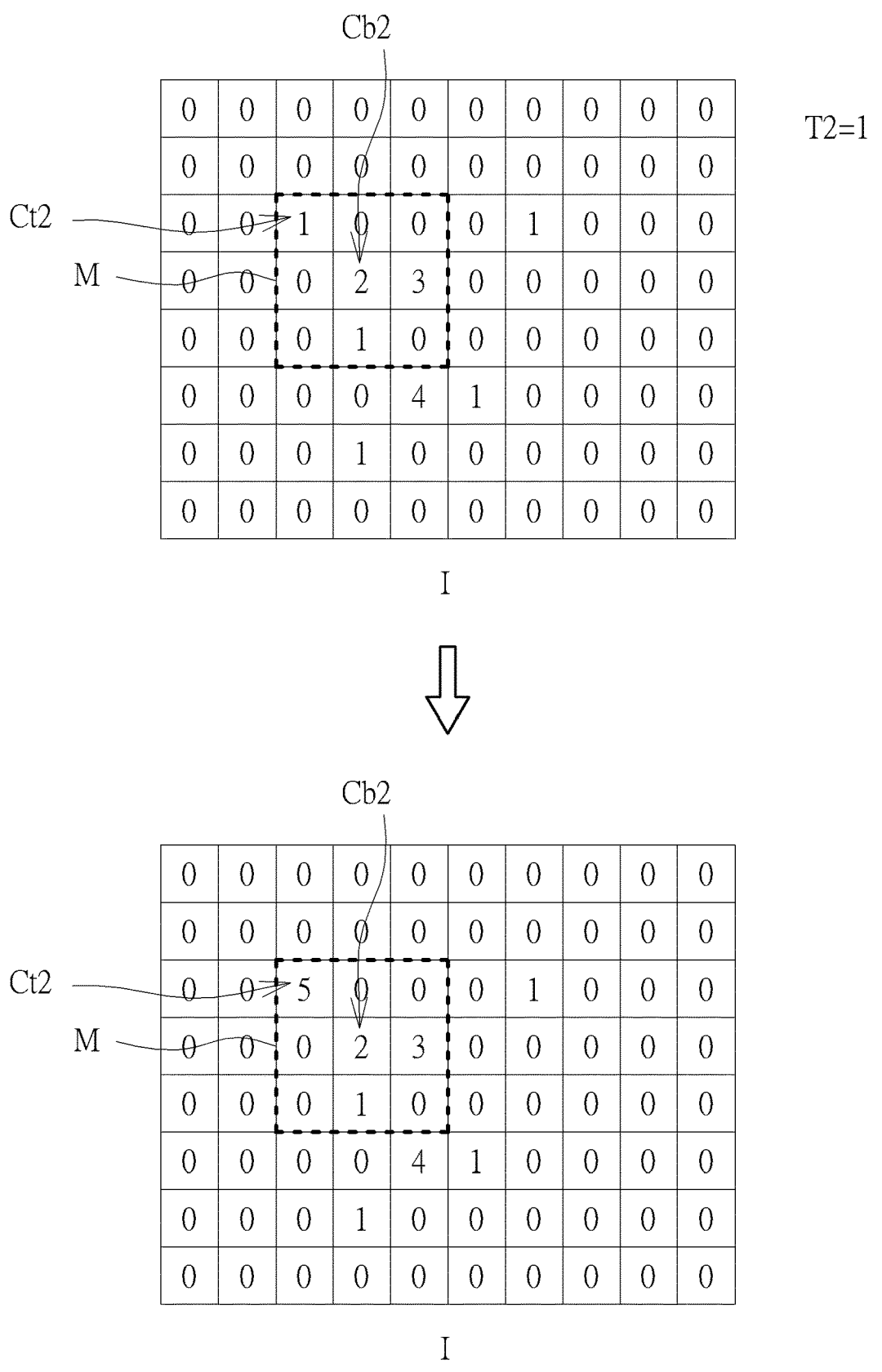
Figure 17:
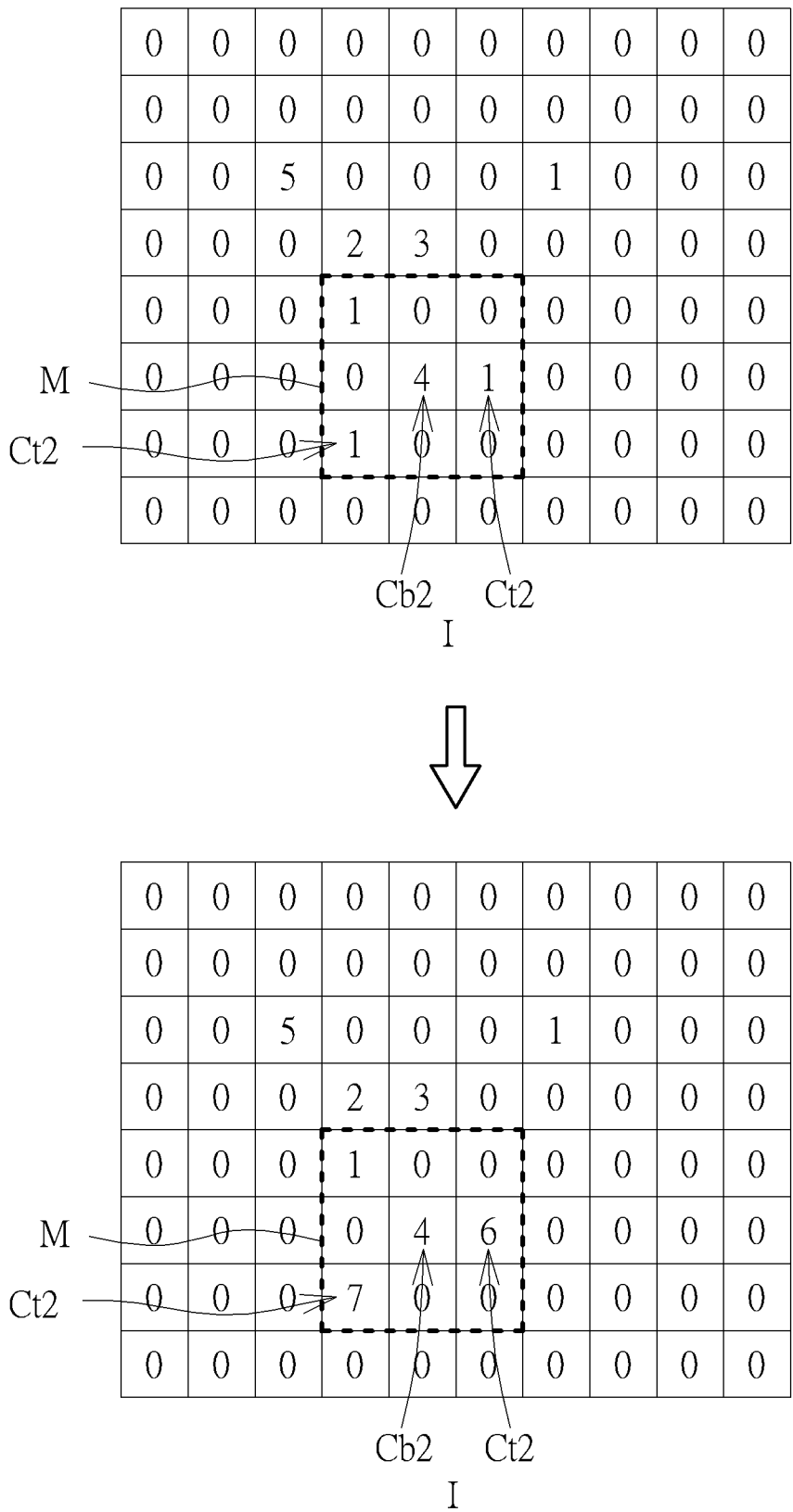

In step S420, illustration of conforming to the second target value T2 may represent an aim of searching a pixel unit which has a marking value greater than the second target value T2 and setting the said pixel unit as the second based pixel unit Cb2, such as the pixel units having the marking values 2, 3 and 4. In step S422, the maximal dimension of the region of interest can be changed in accordance with a positioning result of the second triggering pixel unit Ct2. If the second triggering pixel unit Ct2 cannot be positioned inside the mask M, step S424 can be executed to determine that the maximal dimension of the region of interest corresponds to the initial triggering pixel unit Ci and the first triggering pixel unit Ct1; for example, the mask M shown in FIG. 17 does not cover the second triggering pixel unit Ct2. If the second triggering pixel unit Ct2 can be positioned inside the mask M, as shown in FIG. 15 and FIG. 17, step S426 can be executed to determine that the maximal dimension of the region of interest at least corresponds to the initial triggering pixel unit Ci, the first triggering pixel unit Ct1 and the second triggering pixel unit Ct2. Therefore, the exposure compensating method of the present invention can broaden the detecting range, and set the initial triggering pixel unit Ci as a center to progressively detect other triggering pixel units around and adjacent to the initial triggering pixel unit Ci, so as to determine an amount of the triggering pixel units covered by the region of interest (which means the maximal dimension).

Then, step S428 can be executed to regulate the marking value of a Mth second triggering pixel unit Ct2 as an amount of the initial marking value and numbers N and M when M number of the second triggering pixel units Ct2 are positioned. A symbol M can be a positive number greater than or equal to a numeral 1. After step S428, the exposure compensating method can further regulate the target value for determining whether the region of interest has the larger dimension, such as repeating execution of step S416 to step S426, for assigning a larger third detection region with a center based on the initial triggering pixel unit Ci, positioning a third based pixel unit conforming to a third target value within the third detection region, and applying the mask with a center based on the third based pixel unit for determining whether a next triggering pixel unit is positioned inside the mask. The repeated execution of step S416 to step S426 can be ceased when there is no triggering pixel unit positioned inside the mask. In the embodiment of the present invention, the target value in a following phase can be adjusted to the numeral 1 when the target value in a previous phase is equal to the numeral 0, such as the embodiment of regulating the first target value to the second target value. If the target value in the previous phase is not equal to the numeral 0, the target value in the following phase can be regulated to an amount of the initial marking value and a quantity of the previous-phase triggering pixel unit. For example, if wondering the region of interest may have the larger dimension after step S428, the third target value in the following phase can be the amount of the initial marking value (which is equal to the numeral 1) and the quantity of the first triggering pixel unit Ct1 (the symbol N is equal to the numeral 3), which means the numeral 4.

In conclusion, the exposure compensating method and the related camera apparatus of the present invention can utilize the triggering threshold to analyze an overexposed degree of the monitoring image, so as to compute the estimating exposure compensating value and then analyze continuity of the overexposed pixels inside the monitoring image, for determining whether a region constructed by the overexposed pixels belongs to the region of interest. If the region constructed by the overexposed pixels belongs to the region of interest, pixel information about the region of interest can be used to compute the weighting adjustment value, and the final exposure compensating value can be computed according to the weighting adjustment value and the estimating exposure compensating value. If the region constructed by the overexposed pixels does not belong to the region of interest, such as the continuous dimension of the overexposed pixels being smaller than dimension of the region of interest, searching for the region of interest is persisted. The estimating exposure compensating value can be adjusted by the weighting adjustment value to generate the final exposure compensating value; if the monitoring image contains a lot of small dimensional scenes, the conventional metering method only gets the estimating exposure compensating value, but the exposure compensating method of the present invention can effectively reduce convergence degree to preserve main details, which means the exposure compensating method of the present invention can prevent overexposure compensation from being affected by overexposure of the region of non-interest, so as to keep intensity of the monitoring image in a receivable visible level.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An exposure compensating method applied to a camera apparatus, the exposure compensating method comprising:
   acquiring a monitoring image captured by the camera apparatus via an exposure parameter;
   computing an estimating exposure compensating value of the monitoring image according to a triggering threshold;
   analyzing continuity in pixels of the monitoring image with intensity conforming to a specific condition to acquire a weighting adjustment value of a region of interest;
   adjusting the estimating exposure compensating value via the weighting adjustment value to generate a final exposure compensating value; and
   adjusting the exposure parameter by the final exposure compensating value;
   wherein the triggering threshold is adjusted according to a dimension of the region of interest.

2. The exposure compensating method of claim 1, wherein the triggering threshold is an amount ratio of pixels with high intensity to total pixels inside the monitoring image.

3. The exposure compensating method of claim 1, wherein analyzing the continuity in the pixels of the monitoring image with the intensity conforming to the specific condition to acquire the weighting adjustment value of the region of interest comprises:
   transforming intensity distribution information of a plurality of pixels inside the monitoring image into weighting distribution information;
   defining a group of pixels belonging to the region of interest form the weighting distribution information; and
   utilizing the group of pixels to compute the weighting adjustment value.

4. The exposure compensating method of claim 3, wherein transforming the intensity distribution information of the monitoring image into the weighting distribution information comprises:
    setting at least one of a high intensity threshold and a low intensity threshold as the specific condition;
    comparing intensity of the plurality of pixels with the at least one of the high intensity threshold and the low intensity threshold to respectively define a related weighting of each pixel in accordance with the intensity distribution information; and
    generating the weighting distribution information in accordance with a plurality of corresponding weights.

5. The exposure compensating method of claim 4, wherein each pixel has a first weighting in response to the intensity greater than the high intensity threshold, and further has a second weighting computed via an interpolation manner in response to the intensity within a range between the high intensity threshold and the low intensity threshold, and further has a third weighting in response to the intensity smaller than the low intensity threshold.

6. The exposure compensating method of claim 5, wherein defining the group of pixels belonging to the region of interest form the weighting distribution information comprises:
    detecting whether one pixel with one of the first weighting and the second weighting is adjacent to another pixel with one of the first weighting and the second weighting inside the weighting distribution information; and
    defining several pixels adjacent to each other and having one of the first weighting and the second weighting as the group of pixels.

7. The exposure compensating method of claim 3, wherein utilizing the group of pixels to compute the weighting adjustment value comprises:
    acquiring a sum of weighting of all pixels inside the group of pixels;
    acquiring a weighting ratio of the sum of weighting to an amount of weighting about the weighting adjustment value; and
    utilizing the weighting ratio to compute the weighting adjustment value.

8. The exposure compensating method of claim 7, wherein the exposure compensating method further sets a high intensity triggering parameter, a low intensity triggering parameter, a high level compensation parameter and a low level compensation parameter to compute the weighting adjustment value, the weighting adjustment value is set as the high level compensation parameter in response to the weighting ratio greater than the high intensity triggering parameter, and further set as the low level compensation parameter in response to the weighting ratio smaller than the low intensity triggering parameter, and further computed via an interpolation manner by utilizing the high intensity triggering parameter and the low intensity triggering parameter according to a difference between the high level compensation parameter and the low level compensation parameter in response to the weighting ratio ranged between the high intensity triggering parameter and the low intensity triggering parameter.

9. The exposure compensating method of claim 1, wherein adjusting the estimating exposure compensating value via the weighting adjustment value to generate the final exposure compensating value comprises:
    computing a product of the weighting adjustment value and the estimating exposure compensating value to be the final exposure compensating value.

10. A camera apparatus comprising:
    an image receiver adapted to acquire at least one monitoring image via an exposure parameter; and
    an operation processor electrically connected with the image receiver and adapted to compute an estimating exposure compensating value of the monitoring image according to a triggering threshold, analyze continuity in pixels of the monitoring image with intensity conforming to a specific condition to acquire a weighting adjustment value of a region of interest, adjust the estimating exposure compensating value via the weighting adjustment value to generate a final exposure compensating value, and adjust the exposure parameter by the final exposure compensating value;
    wherein the triggering threshold is adjusted according to a dimension of the region of interest.

11. The camera apparatus of claim 10, wherein the triggering threshold is an amount ratio of pixels with high intensity to total pixels inside the monitoring image.

12. The camera apparatus of claim 10, wherein the operation processor is further adapted to transform intensity distribution information of a plurality of pixels inside the monitoring image into weighting distribution information, define a group of pixels belonging to the region of interest form the weighting distribution information, and utilize the group of pixels to compute the weighting adjustment value.

13. The camera apparatus of claim 12, wherein the operation processor is further adapted to set at least one of a high intensity threshold and a low intensity threshold as the specific condition, compare intensity of the plurality of pixels with the at least one of the high intensity threshold and the low intensity threshold to respectively define a related weighting of each pixel in accordance with the intensity distribution information, and generate the weighting distribution information in accordance with a plurality of corresponding weights.

14. The camera apparatus of claim 13, wherein each pixel has a first weighting in response to the intensity greater than the high intensity threshold, and further has a second weighting computed via an interpolation manner in response to the intensity within a range between the high intensity threshold and the low intensity threshold, and further has a third weighting in response to the intensity smaller than the low intensity threshold.

15. The camera apparatus of claim 14, wherein the operation processor is further adapted to detect whether one pixel with one of the first weighting and the second weighting is adjacent to another pixel with one of the first weighting and the second weighting inside the weighting distribution information, and define several pixels adjacent to each other and having one of the first weighting and the second weighting as the group of pixels.

16. The camera apparatus of claim 12, wherein the operation processor is further adapted to acquire a sum of weighting of all pixels inside the group of pixels, acquire a weighting ratio of the sum of weighting to an amount of weighting about the weighting adjustment value, and utilize the weighting ratio to compute the weighting adjustment value.

17. The camera apparatus of claim 16, wherein the operation processor is further adapted to sets a high intensity triggering parameter, a low intensity triggering parameter, a high level compensation parameter and a low level compensation parameter for computing the weighting adjustment value, the weighting adjustment value is set as the high level compensation parameter in response to the weighting ratio greater than the high intensity triggering parameter, and further set as the low level compensation parameter in response to the weighting ratio smaller than the low intensity triggering parameter, and further computed via an interpolation manner by utilizing the high intensity triggering parameter and the low intensity triggering parameter according to a difference between the high level compensation parameter and the low level compensation parameter in response to the weighting ratio ranged between the high intensity triggering parameter and the low intensity triggering parameter.

18. The camera apparatus of claim 10, wherein the operation processor is further adapted to compute a product of the weighting adjustment value and the estimating exposure compensating value to be the final exposure compensating value.

* * * * *